(12) United States Patent
Park et al.

(10) Patent No.: US 11,689,754 B2
(45) Date of Patent: Jun. 27, 2023

(54) SYSTEMS AND METHODS FOR PREDICTING VIEWERSHIP AND DETECTING ANOMALIES

(71) Applicant: comScore, Inc., Reston, VA (US)

(72) Inventors: Soyoung Park, Beaverton, OR (US); Lin Qin, Camas, WA (US); Naoko Shimada, Portland, OR (US); Joseph Ruthruff, Damascus, OR (US); Michael Vinson, Piedmont, CA (US)

(73) Assignee: Comscore, Inc., Reston, VA (US)

( * ) Notice: Subject to any disclaimer, the term of this patent is extended or adjusted under 35 U.S.C. 154(b) by 383 days.

(21) Appl. No.: 16/571,130

(22) Filed: Sep. 15, 2019

(65) Prior Publication Data

US 2021/0084375 A1    Mar. 18, 2021

(51) Int. Cl.
| | |
|---|---|
| *H04N 21/25* | (2011.01) |
| *H04N 21/466* | (2011.01) |
| *H04N 21/45* | (2011.01) |
| *H04N 21/442* | (2011.01) |
| *G06F 18/214* | (2023.01) |

(52) U.S. Cl.
CPC ......... *H04N 21/251* (2013.01); *G06F 18/214* (2023.01); *H04N 21/44204* (2013.01); *H04N 21/4532* (2013.01); *H04N 21/4662* (2013.01)

(58) Field of Classification Search
CPC .................................................. H04N 21/20
See application file for complete search history.

(56) References Cited

U.S. PATENT DOCUMENTS

| | | | |
|---|---|---|---|
| 9,137,091 B2* | 9/2015 | Lockerbie | H04L 67/535 |
| 9,781,457 B1* | 10/2017 | James | G06Q 30/0282 |
| 9,838,755 B1* | 12/2017 | Kodige | H04N 21/64322 |
| 10,034,049 B1* | 7/2018 | Deephanphongs | H04N 21/4223 |
| 10,779,042 B1* | 9/2020 | Gupta | H04N 21/44222 |
| 10,986,408 B1* | 4/2021 | Randhawa | H04N 21/8549 |
| 11,044,533 B1* | 6/2021 | Li | H04L 41/0636 |
| 2008/0300894 A1* | 12/2008 | John | H04N 21/44224 705/1.1 |
| 2012/0304234 A1* | 11/2012 | Carbunar | H04N 21/23113 725/93 |

(Continued)

*Primary Examiner* — Mushfikh I Alam
(74) *Attorney, Agent, or Firm* — Blank Rome LLP

(57) ABSTRACT

Prediction models for managing viewership data are disclosed. An amount of time users are displayed content is initially obtained. The obtained amounts may be for each content distributor that distributes channels, for each of the channels with respect to which sets of content are displayed, for each of the sets that comprises content displayed during past periods, and for each of the displayed content. A set of features associated with each of the displays is obtained and a target period is selected from among the past periods. A model is used to predict an amount of time users were displayed content during the target period, for each of the sets, channels, and distributors, based on the obtained sets of features associated with the displays during the target period and on the obtained amounts for the displays during the past periods that precede the target period. A comparison, respectively for the same displays during the target period, of each of the obtained amounts to each of the predicted amounts is performed, and an anomaly is detected based on the comparisons. Finally, the anomaly is alerted.

20 Claims, 7 Drawing Sheets

(56) References Cited

U.S. PATENT DOCUMENTS

| | | | |
|---|---|---|---|
| 2013/0346441 A1* | 12/2013 | Imaki | G06Q 30/02 |
| | | | 707/769 |
| 2016/0050447 A1* | 2/2016 | Nicholas | H04N 21/25891 |
| | | | 725/14 |
| 2017/0006342 A1* | 1/2017 | Nagaraja Rao | H04N 21/25883 |
| 2017/0123614 A1* | 5/2017 | Perlegos | H04N 21/2187 |
| 2017/0195731 A1* | 7/2017 | Girlando | H04N 21/251 |
| 2018/0300494 A1* | 10/2018 | Avidan | G06F 16/1734 |
| 2019/0052939 A1* | 2/2019 | Wang | H04L 9/3236 |
| 2019/0132224 A1* | 5/2019 | Verma | H04L 43/062 |
| 2019/0208242 A1* | 7/2019 | Bates | H04N 21/4826 |
| 2020/0007934 A1* | 1/2020 | Ortiz | G06N 3/0454 |
| 2020/0045353 A1* | 2/2020 | Hennacy | H04N 21/44204 |
| 2020/0099733 A1* | 3/2020 | Chu | G06N 7/005 |
| 2020/0302074 A1* | 9/2020 | Little | G06F 21/6218 |
| 2020/0334833 A1* | 10/2020 | Gibbon | H04N 21/23418 |
| 2020/0404351 A1* | 12/2020 | Brown | H04N 21/2407 |
| 2021/0274244 A1* | 9/2021 | Wondra | H04N 21/812 |

\* cited by examiner

| Target | | | | Features | | | | |
|---|---|---|---|---|---|---|---|---|
| | Hours Viewed | normalized Average Aud. | Distributor No. | Holiday | Time of Day | Day of Week | Day of Month | Month of Year |
| Telecast A | 4,274 | 0.62 | 1 | No | 6:00 PM | Monday | 12th | June |
| Telecast A | 3,547 | 0.51 | 2 | No | 6:00 PM | Monday | 12th | June |
| Telecast A | 1,057 | 0.27 | 3 | No | 6:00 PM | Monday | 12th | June |
| Telecast A | 7,924 | 0.93 | 4 | No | 6:00 PM | Monday | 12th | June |

| Station | MVPD | Predicted num_hours | Actual num_hours | Ratio | Mean (μ) | Standard Error (σ) | Upper threshold (μ+1.5σ) | Lower threshold (μ-1.5σ) | Alert |
|---|---|---|---|---|---|---|---|---|---|
| A | 1 | 2,300 | 4,274 | 1.86 | 1.19 | 0.39 | 1.78 | 0.60 | data spike |
| A | 2 | 3,473 | 3,547 | 1.02 | 1.19 | 0.39 | 1.78 | 0.60 | normal |
| A | 3 | 1,226 | 1,057 | 0.86 | 1.19 | 0.39 | 1.78 | 0.60 | normal |
| A | 4 | 7,836 | 7,924 | 1.01 | 1.19 | 0.39 | 1.78 | 0.60 | normal |

FIG. 5A

| Station | MVPD | Predicted num_hours | Actual num_hours | Ratio | Mean (μ) | Standard Error (σ) | Upper threshold (μ+1.5σ) | Lower threshold (μ-1.5σ) | Alert |
|---|---|---|---|---|---|---|---|---|---|
| B | 1 | 468 | 246 | 0.53 | 0.52 | 0.01 | 0.54 | 0.51 | normal |
| B | 2 | 1,107 | 589 | 0.53 | 0.52 | 0.01 | 0.54 | 0.51 | normal |
| B | 3 | 2,210 | 1,126 | 0.51 | 0.52 | 0.01 | 0.54 | 0.51 | normal |

SYSTEMS AND METHODS FOR PREDICTING VIEWERSHIP AND DETECTING ANOMALIES

TECHNICAL FIELD

The present disclosure relates generally to systems and methods for monitoring and validating viewership data to enhance quality assurance of this data. More particularly, disclosed is a way to predict television (TV) and/or over-the-top (OTT) viewership and to detect data anomalies for subsequent correction.

BACKGROUND

Machine learning combines techniques from statistics and artificial intelligence to create algorithms that can learn from empirical data and that can generalize to solve problems (e.g., make predictions). Predictive modeling generally refers to techniques for extracting information from data to build a model that can predict an output from a given input. Examples of predictive models include Naive Bayes classifiers, k-nearest neighbor classifiers, support vector machines, and logistic regression techniques. Typically, a predictive model is trained with training data. The amount of training data that can be required to train a predictive model can be large, e.g., on the order of gigabytes or terabytes.

Any known techniques applicable to viewership data prediction are based on TV viewership data, including comparative trending, e.g., by using the previous five same days (e.g., Mondays) of previous weeks, subtracting outliers, and averaging viewership values from the remaining same days of the previous weeks to provide a trending benchmark, i.e., to determine whether a target day data is in line with trends. However, because such measurement is at the aggregate level and only looks back to recent trending, it lacks granularity and prediction accuracy to identify difficult-to-detect problems, such as those occurring intra-day.

Known systems often fail in instances where data issues affect isolated viewership, i.e., where they might otherwise be diluted in aggregate (daily, weekly, etc.) monitoring metrics. This type of undetected failure is known as a false negative. There is also a need to minimize alerts for viewing patterns that are not anomalous, this latter type being known as a false positive. For example, in a false positive, there are real increases of special programs' viewership, e.g., the first NFL game airing on a Thursday night. Both circumstances cause inefficiencies by requiring human intervention. Known approaches thus fail by their targets overshooting or undershooting, causing many false alarms and exacerbating the need for manual intervention.

SUMMARY

Systems and methods are disclosed for predicting viewership of an entity (network, station, or, telecast) in the near future using historic data of program, such as airing time and holiday information. The disclosed approach is based on a multi-step process. In a first step, structured data may be collected. In a second step, a prediction model may be trained, tested, and used to make a viewership prediction. In a third step, data anomalies may be detected based on a comparison between the collected and predicted data. In a fourth step, alerts are automatically raised, responsive to such detection; then, the anomalous data may be corrected. And in a fifth step, the previous steps may be periodically repeated.

Accordingly, one or more aspects of the present disclosure relate to a method for managing viewership data. The method is implemented by one or more hardware processors configured by machine-readable instructions and/or other components. The method may comprise: obtaining a total amount of time a plurality of users is displayed a piece of content, (i) for each of a plurality of content distributors that distributes a plurality of channels, (ii) for each of the channels, distributed by each content distributor, with respect to which a plurality of sets of content is displayed, (iii) for each of the sets of content, displayed with respect to each channel, that comprises a plurality of pieces of content respectively displayed during a plurality of past periods, and (iv) for each of the pieces of displayed content; obtaining a set of features associated with each of the displays; selecting a target period from among the plurality of past periods; predicting, via a trained model, a total amount of time users were displayed each piece of content during the target period, for each of the sets, for each of the channels, and for each of the content distributors, based on the obtained sets of features associated with the displays during the target period and on the obtained total amounts of time for the displays during the past periods that precede the target period; comparing, respectively for the same displays during the target period, each of the obtained total amounts of time to each of the predicted total amounts of time; detecting an anomaly based on at least one of the comparisons; and alerting to the anomaly.

Yet another aspect of the present disclosure relates to a system configured for managing viewership data. The system comprises one or more processors and other components or media, e.g., upon which machine-readable instructions may be executed to perform the above-mentioned method. Implementations of any of the techniques described herein may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Other features will be apparent from the following description, including the drawings and claims. The drawings, though, are for the purposes of illustration and description only and are not intended as a definition of the limits of the disclosure.

FIG. 5A illustrates exemplary data for one piece of content and channel distributed by different distributors, including values calculated for detecting a data spike, in accordance with one or more embodiments.

FIG. 5B illustrates exemplary data for one piece of content and channel distributed by different distributors, including values calculated for eliminating a false positive, in accordance with one or more embodiments.

DETAILED DESCRIPTION

Figure 1:
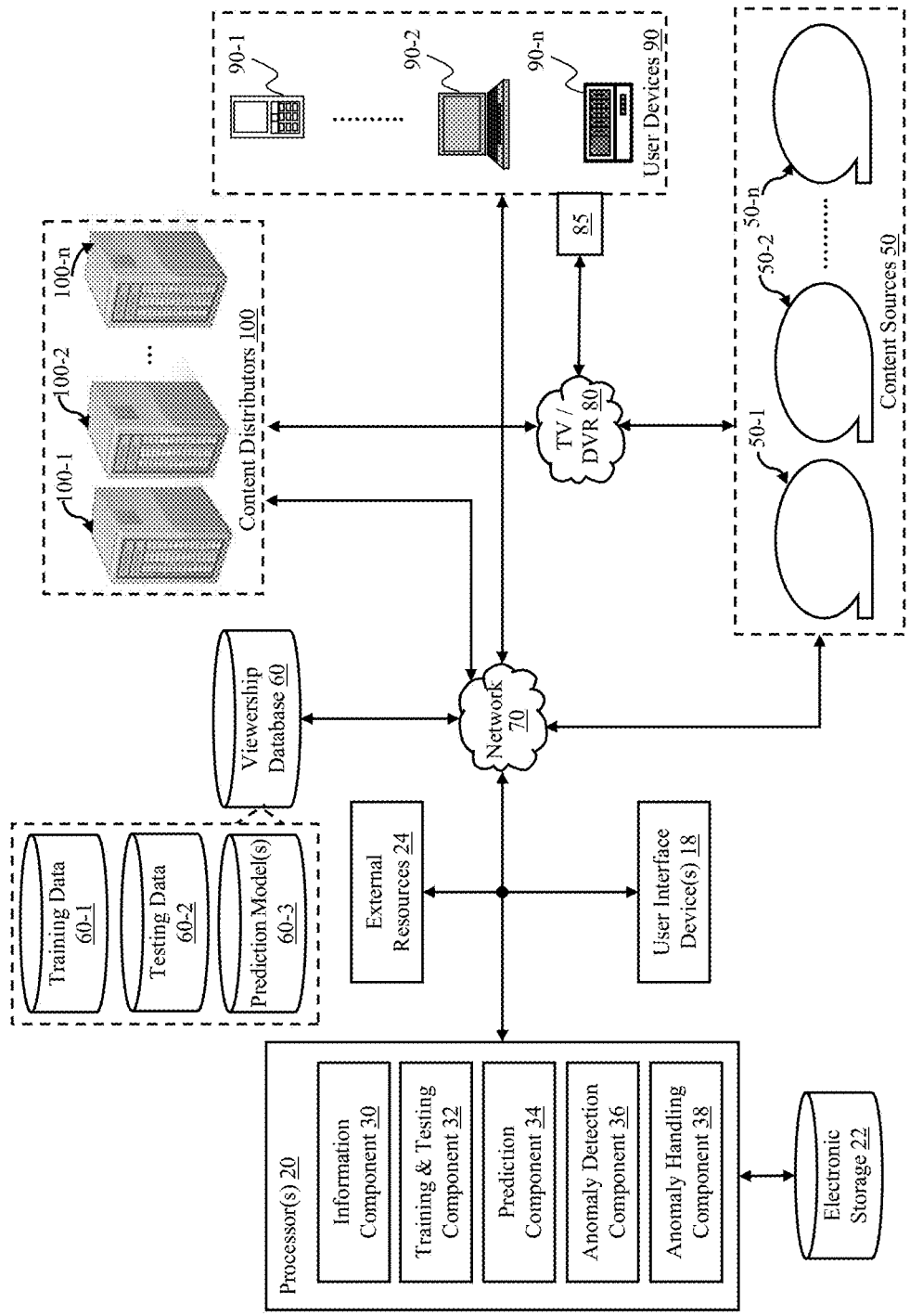
FIG. 1 illustrates an example of a system in which a multitude of data from multiple sources is collected and analyzed, for detecting and handling anomalies in the data, in accordance with one or more embodiments.

Ways of predicting viewership data, validating reported viewership data, and reacting to (e.g., correcting) the predictions and validations are described. FIG. 1 illustrates a system 10 configured to obtain high-resolution viewership data (e.g., intra-day, intra-hour, etc.) with respect to a plurality of different views of content by a plurality of different users/devices of a plurality of different pieces of the content of a plurality of different sets of pieces of content of a plurality of different channels/stations each distributed by a plurality of different distributors. System 10 is further configured to obtain categorical features/variables each descriptive of either some aspect of the content view or factors that potentially impact the extent of the content view (e.g., holiday information). System 10 is further configured to train a prediction model and then to use the trained model to predict viewership on at least a target day, for comparing the prediction to the obtained viewership data. System 10 is further configured to raise an alert, when the predicted amounts diverge from the obtained amounts by a particularly determined threshold amount. As such, system 10 may be configured to predict or detect subtle issues with high levels of granularity and accuracy.

Known approaches merely monitor aggregated viewership at a level of stations or channels. The aggregated day-level data may have high variability due to only using a few weeks of data; this hinders abnormality detection. In contrast, the presently disclosed approach is to use individual viewership data, e.g., at the more granular telecast/piece-of-content level. In some embodiments, this viewership data is in relation to one or more multichannel video programming distributors (MVPDs) and/or one or more multiple service operators (MSOs), such as a cable TV operator or provider, a multichannel multipoint distribution service, a direct broadcast satellite service, a television receive-only satellite program distributor, and/or an online distributor such as YouTube (this online distributor being a potential, exemplary content source). In this disclosure, market and distributor may be used synonymously, just as station and channel may be used synonymously, and just as telecast and a piece of content may be used synonymously. In some embodiments, a piece of content may refer to a telecast, series, over-the-top program, or a recurrent program.

Depending on a distributor's different data collection and transmission techniques and processes, different types of data anomalies (e.g., missing data, data drop, data spikes, etc.) may be introduced into the reporting viewership data. Ratings measurements based on such anomalous data therefore will not represent true audience viewing behavior, nor should it be used by stakeholders in contractual transactions.

Some embodiments may resolve known issues of prior approaches by increasing the resolution of data analysis to catch data anomalies at more fine-grained levels by fitting historical datasets into high-dimensional models. The herein disclosed fine-grained levels may comprise data at different combinations of a MVPD-station-telecast or of a distributor-channel-piece-of-content.

Each telecast or piece of streamed content may be a local or national program, such as a local morning news, an episode of a popular TV show, or a national basketball association (NBA) playoff game. The content may be aired via a certain station or channel, with a specific start-time and run-time. A number of hours viewed, for each telecast of each station by each distributor's reporting subscribers on a target day, may be predicted based on the past several (e.g., 13) months or even years of scheduled telecast-level viewership. This viewership data may be known over a consistent airing schedule and stored in database 60. Compared to known aggregate day-level data prediction approaches that are based on only the past few (e.g., five) weeks of data, the accuracy of targeted analysis and anomaly detection is improved by the disclosed approach. For example, subtle issues that may occur during specific parts of the day may now be pinpointed.

Some embodiments may obtain, predict, and/or validate viewership data at a granular level, such as audience viewing durations measured in portions of an hour (e.g., 5 minutes, 15 minutes, 30 minutes, and/or 45 minutes). For example, the total amount of time a plurality of users is exposed to each piece of content may be measured at quarter-hour increments. System 10 may be able to detect partial day anomalies (e.g., a particular hour of a day), whereas known approaches average out for the whole day and thus bury finer-grained clues in the daily averages. System 10 may train a model to predict viewership data at a granular level. In some embodiments, this is done without need of human involvement, such that raised alerts have a minimum amount of (or none) false positives.

Some embodiments may adapt machine-learning techniques to a practical application, namely the technological management of online and/or TV viewership data, e.g., for the repair of data that is detected to be potentially anomalous. Some embodiments may operate artificial intelligence (AI). The prediction models may be and/or include one or more neural networks (e.g., deep neural networks, artificial neural networks, or other neural networks), other machine learning models, or other prediction models. An artificial neural network may be configured to determine a classification (e.g., whether a data point is anomalous) based on existing viewership data and characteristic input features. An artificial neural network is a network or circuit of artificial neurons or nodes for solving particular AI problems. Such artificial networks may be used for predictive modeling. These models may be self-learning and trained, rather than explicitly programmed, and can perform significantly better in certain areas of problem solving, as compared to traditional computer programs.

Once trained, a prediction model obtained from database 60-3 may operate at a rate of thousands, millions, or even billions of predictions per minute. Training and testing component 32 of FIG. 1 may thus prepare one or more prediction models to generate predictions. For example, a prediction model may analyze its predictions against a reference set of data called the test dataset. In some use cases, the reference outputs may be provided as input to the prediction models, which the prediction model may utilize to determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to viewership numbers. For example, a labeled training set may enable model improvement. That is, the training model may use a validation set of data to iterate over model features until the point where it arrives at a final set of features or weights to use in the model.

In some embodiments, the inputs to the prediction model are reported viewership data (e.g., of the past several months or a few years), features descriptive of that data, and an audience measurement metric, such as a normalized average audience.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network (e.g., the Internet), electronic storage, equipment related to Wi-Fi technology, equipment related to Bluetooth® technology, data entry devices, and/or other resources. In some implementations, some or all of the functionality attributed herein to external resources 24 may be provided by resources included in system 10. External resources 24 may be configured to communicate with processor 20, user interface device 18, electronic storage 22, and/or other components of system 10 via wired and/or wireless connections, via a network (e.g., a local area network and/or the Internet), via cellular technology, via Wi-Fi technology, and/or via other resources.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 do not include processor 20, electronic storage 22, external resources 24, and/or other components of system 10, but instead communicate with these components via dedicated lines, a bus, a switch, network, or other communication means. The communication may be wireless or wired. In some embodiments, user interface devices 18 are laptops, desktop computers, smartphones, tablet computers, and/or other user interface devices.

Data and content may be exchanged between the various components of the system 10 through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6). In another example, data may be exchanged employing a protocol used for communicating data across satellites and/or coaxial cables.

In some embodiments, processor 20 may belong to a user device, a consumer electronics device, a mobile phone, a smartphone, a personal data assistant, a digital tablet/pad computer, a wearable device, a personal computer, a laptop computer, a notebook computer, a work station, a server, a vehicle computer, a game or entertainment system, a set-top-box or any other device. As such, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

As shown in FIG. 1, processor 20 is configured via machine-readable instructions to execute one or more computer program components. The computer program components may comprise one or more of information component 30 (e.g., for data retrieval and pre-processing), training and testing component 32, prediction component 34, anomaly detecting component 36, anomaly handling component 38, and/or other components. Processor 20 may be configured to execute components 30, 32, 34, 36, and/or 38 by: software; hardware; firmware; some combination of software, hardware, and/or firmware; and/or other mechanisms for configuring processing capabilities on processor 20.

It should be appreciated that although components 30, 32, 34, 36, and 38 are illustrated in FIG. 1 as being co-located within a single processing unit, in embodiments in which processor 20 comprises multiple processing units, one or more of components 30, 32, 34, 36, and/or 38 may be located remotely from the other components. The description of the functionality provided by the different components 30, 32, 34, 36, and/or 38 described below is for illustrative purposes, and is not intended to be limiting, as any of components 30, 32, 34, 36, and/or 38 may provide more or less functionality than is described. For example, one or more of components 30, 32, 34, 36, and/or 38 may be eliminated, and some or all of its functionality may be provided by other components 30, 32, 34, 36, and/or 38. As another example, processor 20 may be configured to execute one or more additional components that may perform some or all of the functionality attributed below to one of components 30, 32, 34, 36, and/or 38.

User devices 90, depicted in FIG. 1, may consume content provided by content distributors 100 and/or content sources 50. User devices 90 may be of different types, such as TVs and projectors, that consume content via network 80 and/or network 70. Receivers 85 may include any device configured to receive media content from content distributors 100 and transmit the media content to one or more display components of user devices 90. User devices 90 may therefore view content from content sources 50 via content distributors 100 using set-top boxes (STBs) 85 provided and managed by content distributors 100. For example, receivers 85 may include external cable television converters configured to receive media content via a coaxial cable and transmit the media content to a TV. User devices 90 may also be connected to similar content or video-on-demand (VOD) content via digital video recorder (DVR) 85, digital media receiver (DMR) 85, internal tuner 85, or satellite receiver 85. Content distributors 100 may thus include satellite television operators, local or regional broadcasters, and/or any other distributors of media content through network 80 and/or network 70.

In some embodiments, receivers 85 may be configured to generate tuning data indicative of media content they access. Receivers 85 may be configured to save the tuning data, for example, in an internal data storage (which may subsequently be accessed via network 70) and/or transmit the tuning data to content distributors 100 (via network 80 or network 70). The tuning data may be indicative of content (e.g., movies, television shows, music, or other media) accessed by receivers 85 through content distributors 100. The tuning data may also be indicative of media content accessed by offline user(s), such as content accessed from an internal storage device of DVR 85.

The users that consume the content may additionally or instead access network 70 via handheld device 90-1, laptop 90-2, desktop computer 90-n, and/or built-in device 90-n (in a mobile vehicle such as a motor vehicle or in a gaming device). User devices 90 may be connected to network 70 to send requests for content, receive the content in response, and provide tuning data to processors 20 (e.g., directly or via content distributors 100).

The tuning data may include, for example, one or more channels accessed, the media content outputted to display component(s) of user devices 90, a time-date stamp associated with the accesses (e.g., the date/time the access began, ended, and/or duration), and/or other information descriptive of the access. The time-date stamp may be stored in a number of different formats, such as the number of seconds elapsed since a reference time.

As used herein, "channel" may refer to any identifier of a particular source of video content, for example: a network name (e.g., ABC or CBS), a broadcast organization's call sign (e.g., KOMO-TV), an analog or digital broadcast or demodulation frequency (e.g., 615.25 MHz), a "real" channel (which may correspond to an actual transmission frequency (e.g., 38), a "virtual" channel (not representing an actual frequency, e.g., SiFy channel), a main channel by itself (e.g., 4), a sub channel number by itself (e.g., 0.1), a main channel combined with a sub channel (e.g., 4.1), a digital networking address such as an internet protocol (IP) address, a uniform resource locator (URL), a video sharing website channel (such as a YouTube user's content channel), a content identifier (e.g., Superbowl 2019, Seinfeld season 3, episode 2, or the name of a pay-per-view program), or any other content identifier utilized for cable television, broadcast television, satellite television, Internet viewing, and/or other content viewing.

Content distributors 100 may be configured to receive (e.g., irregularly, periodically, or on request) the tuning data from content sources 50, from third-party aggregators of tuning data (not shown), directly from receivers 85 via network 80, and/or directly from user devices 90 via network 70. Processors 20 may obtain access to the tuning data and save it as viewership data within viewership database 60. By analyzing the tuning data, processors 20 may be configured to determine viewing habits, such as the duration that the media content is accessed, a particular source that is accessing the content, and/or a type of media content. The tuning data may also provide such information as channel changes, recording or replaying of media content, and changes in playback of content. In some embodiments, networks 70 and/or 80 may facilitate content viewership over a plurality of different channels that respectively pertain to a plurality of different content sources.

Content distributors 100 may be configured to access names and/or other identifying information of members (e.g., users) of the households associated with user devices 90. Accordingly, content distributors 100 may be configured to correlate receivers 85 to users of the associated household. The tuning data may also be associated with a unique identifier, so that the tuning data is attributable to the respective receiver 85 or user device 90. The unique identifier may be an identifier of the customer premises equipment (e.g., the MAC address of STB 85 or of user device 90), an identifier of a user associated with user device 90 or with receiver 85 (e.g., a cable television customer account number, phone number, etc.), a globally unique identifier ("GUID"), the address of the physical location of the display component, and/or similar identifying elements.

The herein disclosed prediction model may be trained using training data obtained by training component 32 from training data storage/database 60-1, shown in FIG. 1. This training data obtained from viewership database 60 of FIG. 1 may comprise thousands, millions, or even billions of data points (e.g., number of hours viewed, normalized average audience, and features of the viewings). In some embodiments, the dataset may be split between training, validation, and testing datasets in any suitable fashion. That is, the obtained data may be split into a training dataset and a testing dataset for the presently disclosed machine learning model. For example, the split may be by a ratio of 120:1, as exemplarily depicted in FIG. 4A. In some embodiments, the split is in time order. The target day, in relation to which system 10 endeavors to predict or validate, may be one of the most recent days in the testing dataset. The validation or testing dataset may be a subset of the training dataset, which may be kept hidden from the model to test accuracy of the model. The test dataset may be a dataset that is new to the model, to test accuracy of the model.

Some embodiments may gather STB tuning information from many (e.g., tens of millions) households subscribed to distributors or to TV service providers, which report at least some of such information. These distributors and TV providers may operate in one or more of several dozen (e.g., hundreds) markets. Some embodiments may then project the reporting data out to measure viewership, with respect to TV stations and cable networks, across substantially all households of a region or country. In these or other embodiments, tuning data may be reported, collected, and projected with respect to OTT content providers.

In some embodiments, information component 30 is configured to remotely receive viewership or tuning data, including number of hours (num_hours) pieces of content were viewed and sets of variables, and store the data in databases 60. Databases 60, used for retrieving one or more of the variables, may be the same as or different from the databases used for retrieving other variables and from the storage used for retrieving the normalized average audience.

Some embodiments of information component 30 may support hundreds or even thousands (e.g., 1,730) of stations or channels. That is, some embodiments may obtain viewership data of content from some or all of these channels over the past several (e.g., 13) months. The obtained data may include telecast information from each of the distributors for each of the pieces of content distributed for each set (e.g., a series) of content. This dataset procurement process may include obtaining data of a target day (e.g., the last day in a several-month reporting window). For example, if the target day is Jun. 23, 2018, the past 13 months or 400 days of actual reporting data (i.e., from May 22, 2017 through Jun. 23, 2018) may be pulled from database 60. Some embodiments of information component 30 may obtain datasets for training and testing a machine learning model. The datasets may comprise target data and features data. The features may be used as predictors for the target day.

Figures 2A, 2B:
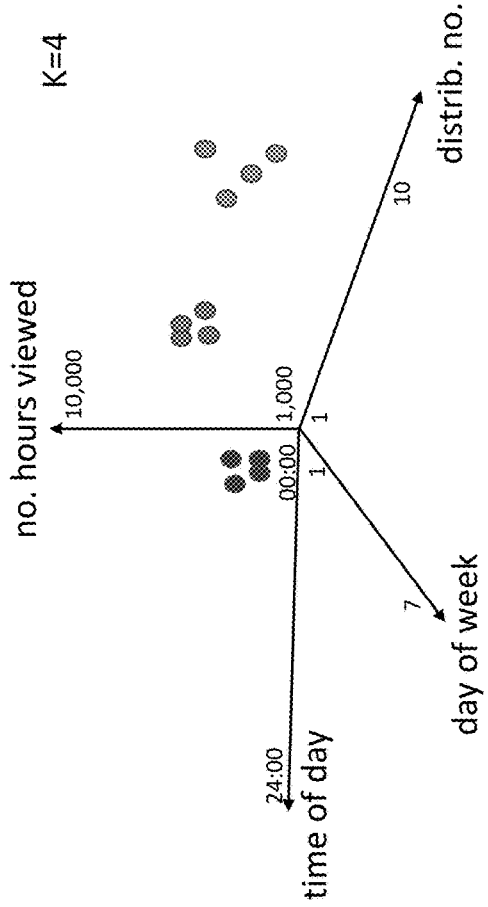
FIG. 2A exemplarily illustrates a multi-dimensional plotting of obtained data points or of feature vectors, in accordance with one or more embodiments.
FIG. 2B illustrates a chart of exemplary viewership data points with respect to display of one piece of content over one channel as distributed by different distributors, in accordance with one or more embodiments.

In some embodiments, information component 30 is configured to obtain features comprising viewership hours with respect to local or national TV programs aired on a single station or on all stations in a TV market of reporting households. Although in FIG. 2A only circles representing different data points are shown, this graph may also be used to plot multi-dimensional vectors. As shown in FIG. 2A, some embodiments embed the features and viewership data into several dimensions. These dimensions may include the average audience, whether a program was viewed on a holiday, the month of viewing, the day of week of viewing, etc., to detect impact of the features on viewership, such as seasonal changes. In some embodiments, the features may further comprise geographic regions of local stations or homes (e.g., to train and validate the models).

In some embodiments, the obtained features operate as independent variables in the model to explain a dependent variable. The dependent variable is what the model of system 10 may be trying to predict, forecast, or validate. Other synonymous names used interchangeably herein for dependent variables include response variables, objective variable, regressands, criterion variables, measured variables, responding variables, explained variables, outcome variables, output variables, experimental variables, and labels. Similarly, names for the independent features/variables used interchangeably herein are categorical variables, predictive variables, input variables, parameters, attributes, explanatory variables, predictors, regressors, controlled variables, manipulated variables, and exposure variables. The independent and dependent variables may have real or discrete values.

The presently disclosed machine learning approach operates by learning from observations of the independent variables. The disclosed machine-learning may be performed as computer-based data analysis, i.e., between a cause (independent variable) and an outcome (dependent variable). Training and testing component 32 may be configured to analyze training data obtained from training data database 60-1 and learn a model that generalizes a relationship between the different types of variables.

In some embodiments, training component 32 is connected to network 70 (e.g., the Internet). The connection to network 70 may be wireless or wired. In some embodiments, training and testing component 32 is configured to obtain training viewership data from content sources 50, content distributors 100, user devices 90, electronic storage 22, external resources 24, viewership database 60 (e.g., training data 60-1), and/or via user interface device(s) 18.

In some embodiments, training component 32 may enable one or more prediction models to be trained. Once trained, the model(s) may be stored in database/storage 60-3 of viewership database 60, as shown in FIG. 1, and then used to make predictions and to validate existing viewership data based on a normalized average audience and one or more features.

In some embodiments, training and testing component 32 is configured to train the model using several weeks, months, or even years (e.g., 400 days) of viewership data. Some embodiments may perform training using decision trees. In these or other embodiments, system 10 may perform clustering analysis to put similar behavior data together and to use that to predict future behavior. The clustering approach is discussed further, below.

In a decision tree, each internal node represents a test on an independent variable, each branch representing the outcome of the test and each leaf node representing a class label (decision taken after analyzing many or all of the independent variables). As such, some embodiments of training and testing component 32 may test each of the features in a series of questions (e.g., "is today Monday? is today in the month of June?") that map to one or more decision trees. For example, some embodiments of training and testing component 32 may be configured to implement such machine-learning methods as learning which questions to ask about these features to classify the entity they describe. Some embodiments of training and testing component 32 may identify which of the independent variables it considers most important. The random forest algorithm may generate this importance as part of the model training process.

In these or other embodiments, training and testing component 32 may implement the process of feature/variable selection by selecting a subset of relevant features for use in a prediction model's construction. For example, a user may select (e.g., via user interface device 18) which features to feed into the model. In this or another example, training and testing component 32 may automatically determine the features or automatically use all of the available features.

The obtained features data may comprise a normalized average audience (norm_series_avg_aa) that viewed each piece of content of each series (or of each set of pieces of content) of each channel distributed by each of the distributors. That is, this normalized average audience may be calculated for each distributor-channel-telecast combination using the obtained viewership data. An average audience may be the average number of TVs or user devices 90 tuned into an entity (telecast, series, or network) throughout a selected timeframe. The average audience may be calculated, e.g., by dividing a total number of hours viewed by a length of the timeframe (e.g., in hours). The input feature norm_series_avg_aa is thus based on an average audience measured for each set of content (e.g., a TV series) aired on a single, local station over the past 13 months, including the target day. For example, norm_series_avg_aa may be determined for the Big Bang Theory TV show aired on the ABC station, which, in this example, is affiliated with the KABC station of Los Angeles. Then, the average audience may be normalized by a highest-viewed series, which may be, e.g., an airing of the yearly Super Bowl. Some embodiments may set norm_series_avg_aa to be 1 for this highest-viewed series so that all other series' average audiences may be normalized against the average audience of the highest viewed series. The norm_series_avg_aa of any other series may thus be some value less than 1.

The obtained features data may further comprise a categorical variable for the distributors, which may indicate the distributor from which the data is collected. The prediction model to be trained may include five reporting distributors (e.g., Dish, DirecTV, Cox, Charter Spectrum, AT&T, Comcast, Verizon, or other distributor/MSO). For example, if the obtained viewership data is from Dish, then a categorical variable "is_Dish" may be set to 1, and all the remaining variables (e.g., "is_DirecTV," "is_Cox," "is_Charter," etc.) may be set to 0. In some embodiments, a distributor variable (e.g., "is_AT&T" variable) may be intentionally removed to prevent multilinearity.

The obtained features data may further comprise a categorical variable for holidays, which may indicate whether the viewership data of that day is on a national holiday. This variable may further indicate which particular holiday it is. This variable is significant because holidays may play an important factor in content viewership, and the historical audience behavior during holidays may serve as a good predictor for an upcoming year's holiday viewership. Therefore, such information may be included in the model as a feature. For example, if it is Christmas day, then the categorical variable "is_Christmas" is equal to 1, and all the remaining holiday categorical variables are set to 0. Any national holiday of any nation is contemplated by the present disclosure.

The obtained features data may further comprise a categorical variable for the day of the week, which may indicate the day of the week that the program is viewed or aired. For example, the viewership pattern during weekends may be very different from weekdays, due to the different programming and peoples' availability. As an example, if a program aired on a Monday, then the "is_Monday" variable is set to 1, and all the remaining categorical variables for the other days of the week are set to 0. Similarly, the obtained features data may further comprise a categorical variable for the day of the month (e.g., the $12^{th}$).

The obtained features data may further comprise a categorical variable for the hour at which a program is viewed or aired. For example, if the piece of content aired at 6:00 PM, then an "is_6 pm" variable may be set to 1, while all the other categorical variables for the other hours of the day may be set to 0.

The obtained features data may further comprise a categorical variable for the month of the year during which a program is viewed or aired. For example, if the piece of content aired in June, then an "is_June" variable may be set to 1, while all the other categorical variables for the other months of the year may be set to 0.

These mentioned features are depicted exemplarily in FIG. 2B, but they are not intended to be limiting. That is, other undepicted features may be used instead of or in addition to the ones of FIG. 2B, such as a program identifier, a series identifier, and a runtime of the piece of content. In some implementation, the more features that are used, the more accurate the prediction model may be.

Even when prior viewership data is lacking, the disclosed classifier may provide the most important features and how they relate to, or interact with, each other. As such, the decision tree may classify each sample (e.g., a single viewership datum) through a forking path of decision points, each decision point having a rule determining which branch to take. By traversing the tree, training and testing component 32 may stop at each decision point to apply its rule to one of the features, eventually arriving at the end of the branch (i.e., at a leaf). The leaf may have a class label so prediction component 34 may conclude traversing a path through the tree by assigning the sample (e.g., the single viewership datum) to that class.

Some embodiments of training and testing component 32 may implement an ensemble learning approach to train the prediction model. Some embodiments may implement a collection of decision trees that have been trained on subsets of training data (e.g., num_hours data, norm_series_avg_aa data, and the independent variables). Decision trees are tree-like graphs that model a decision. Some implementations of random forests may make use of predictions by returning a mode or mean of the predictions of their constituent trees. These or other scikit-learn (sk-learn) implementations may return the mean of the trees' predictions. The disclosed random forests approach, via the plurality of trees, may learn from substantially all of the values of norm_series_avg_aa data and from the independent variables. These decision trees may even learn to ignore independent variables that are not important or relevant to predicting the num_hours value. In some embodiments, norm_series_avg_aa may be an independent variable used to predict the num_hours, num_hours being the dependent variable.

The random forest algorithm fits multiple trees, each tree in the forest being built by selecting (e.g., randomly, algorithmically, or by a user via user interface) different features from the dataset. The nodes of each tree may be built up by choosing and splitting to achieve maximum variance reduction.

Some embodiments of training and testing component 32 may implement hyperparameter tuning of the model for higher prediction accuracies. Other embodiments may not need hyperparameter tuning, since comparing across different distributors compensates poor accuracy of unexpected events (e.g., a shooting spree, weather, etc.). Hyperparameters may be parameters of the model that are not learned automatically and that must be set manually. Hyperparameter tuning may not be necessary because information about the distributor as one of the model features may provide a sufficient level of accuracy, e.g., by comparing the predicted viewership across different distributors for one station/telecast.

In contrast to the training dataset obtained from database 60-1 and used to train a prediction model, the testing dataset of database 60-2 may be features and other data used to assess the performance of the model. The test dataset is thus a similar collection of observations that may be used to evaluate the performance of the model using some performance metric. Training and testing component 32 may not include any feature or other data from the training set in the test set, keeping them purposefully separated and distinct from another. While predicting on the test dataset, training and testing component 32 may average the individual trees output to obtain a final output. The variables with the highest difference may be considered most important, and the ones with lower values may be considered less important.

Some embodiments of training and testing component 32 may implement other ensemble learning approaches, such as gradient boosting machines (GBM), boosting, bootstrapped aggregation (bagging), AdaBoost, stacked generalization (blending), bucket of models, Bayes optimal classifier, Bayesian model combination, or gradient boosted regression trees (GBRT).

A target day may be any day in a reporting-time window, the idea being to catch any issue before the target day's data finalizes. Otherwise, if an anomaly becomes known after the day finalizes then users of system 10 would need to execute error handling procedures and perform reprocessing of the data manually, which is time consuming and expensive. Some of the herein disclosed goals are thus to produce audience measurement data that are accurate, useable, and trusted by other parties (e.g., in the marketplace). In some embodiments, these measurements may not change unless something is wrong, providing thus a stable point to transact on or to use the data as currency.

The obtained data may comprise a number of hours (num_hours) that devices reportedly viewed each combination of distributor (e.g., of a market), channel (e.g., by a station), and piece of content (e.g., a telecast of a series) on a target day. Some embodiments may support a multi-day (e.g., 11 days) reporting-time window between a first day preliminary audience measurements begin to be officially reported and a final day the audience measurements are finalized. For example, if today is June $29^{th}$, then the reporting-time window is from June $18^{th}$ to June $28^{th}$, all the data for these days in this reporting-time window being preliminary (i.e., not yet finalized). That is, the obtained viewership data of each of these days is subject to update or correction, until the final day advances. Here, any day within the reporting-time window, such as June $23^{rd}$, may be selected (e.g., via user interface device 18) as a target day. Therefore, in this example, if system 10 was to detect a data anomaly, there would be five days of time to investigate the root cause and correct the data anomaly.

FIG. 2A depicts a plotting of datapoints in an N-dimensional feature space, N being a natural number equal to the number of features used to train a prediction model. Each datapoint may therefore have multiple values, such as a distributor number (no.) that distributed the piece of content (e.g. 2), a day of the week that content was displayed (e.g., Monday), a time of the day the content was displayed (e.g., 6:00 PM), and a number of hours the piece of content was reportedly viewed at a plurality of different devices (e.g., 4,274 hours). These datapoints may be plotted for determining clusters. FIG. 2B depicts a table of exemplary values, which may be used to populate the graph of FIG. 2A. But the depiction of FIG. 2A is not intended to limit the disclosure to clustering approaches, as a random forest algorithm (e.g., ensemble decision trees) may alternatively or additionally be used.

In some embodiments, one machine learning model from among a plurality may be selected for the classification/clustering. For example, a K-nearest neighbors (KNN) algorithm may be used to better classify viewership data with respect to the high-dimensional input data (e.g., the independent variables). Each of the features/variables associated with each of the displays may be a different dimension. This example of FIG. 2A depicts use of the KNN algorithm, where K is a natural number (e.g., 4). For classification, some embodiments of training and testing component 32 may find the center point of each cluster that has a minimum distance from each data point to be clustered. The learning task is thus to discover groups of related observations, within the training data, via measuring a closeness or distance. Exemplarily, training and testing component 32 may determine the four nearest neighbors to have similar viewership features.

The model representation for KNN may be the entire training dataset. By use of KNN, some embodiments may make predictions using the training dataset directly. Predictions are made for a new data point by searching through the entire training set for the K most similar data points (i.e., the neighbors) and by summarizing the output variable for those K data points. To determine which of the K data points in the training dataset are most similar to a new input, a distance measure is used. For example, the distance measure may be based on Euclidean, Hamming, Manhattan, Minkowski, Tanimoto, Jaccard, Mahalanobis, and/or cosine distance. Each data point may vote for its class, and the class with the most votes may be taken as the prediction. The herein disclosed use of KNN may make predictions just-in-time by calculating the similarity between an input sample and each training data point. But this is not intended to be limiting, as the KNN approach may be replaced with other data point based learning approaches, such as learning vector quantization (LVQ), self-organizing map (SQM), or locally weighted learning (LWL).

In some embodiments, prediction component 34 is configured to obtain from prediction model 60-3 a machine-learning model for classification purposes. The obtained model may be trained to predict values for the dependent variable (num_hours) using the norm_series_avg_aa values and a plurality of independent variables. For example, the model may be trained to predict a number of hours a particular telecast was viewed by a plurality of users in a plurality of households. As such, user devices 90 may pertain to a multitude of different people (e.g., thousands, hundreds of thousands, or even several millions of people). In some embodiments, the people may consume content with their devices 90 in different households. In these embodiments, some people may have multiple user devices 90 in a same household.

In some embodiments, prediction component 34 is configured to use one model for every distributor-channel combination.

In some embodiments, anomaly detection component 36 is configured to determine deviations between a predicted num_hours value and an obtained num_hours value, i.e., deviations that breach a threshold for each displayed piece of content distributed with respect to a channel.

Once the num_hours of a telecast is predicted on the target day for each distributor and station, anomaly detection component 36 may calculate a ratio of predicted num_hours and actual num_hours reported on the target day. Then, anomaly detection component 36 may calculate the mean ($\mu$) and standard error ($\sigma$) of the ratios from the same telecast and station across all the reporting distributors. If the calculated ratio of predicted num_hours and actual num_hours is higher than an upper threshold—i.e., a threshold determined by $\mu+\beta\sigma$, where $\beta$ is an absolute threshold statistically set to be multiplied by the standard error—then this distributor of the corresponding station and telecast may be alerted to this breach (e.g., a data spike). This scenario is exemplarily depicted in FIG. 5A, where $\beta=1.5$ (but this value for $\beta$ is not intended to be limiting). Similarly, if the calculated ratio is below a lower threshold—i.e., a threshold determined by $\mu-\beta\sigma$—then this distributor of the corresponding station and telecast may be alerted to this breach (e.g., a data trough). In either scenario, the alert may warrant an investigation of the threshold breach, in some embodiments. By contrast, if the calculated ratio were to fall within the upper and lower thresholds, then the corresponding viewership data may be deemed normal, without triggering an alert. In some embodiments, an absolute threshold to determine a data spike or a data drop with real, known data issues may be based on a value of $\beta$ being 0.5, 1, 1.5, or 2. In some embodiments, the value of $\beta$ may be statistically determined for more accurate prediction results. In some embodiments, anomaly detection component 36 is configured to raise different levels of alerts based on the amount of the ratio value breaching the upper or lower threshold.

Each of the above comparisons, with respect to the calculated ratios and thresholds, may be performed across all reporting distributors for a single station and telecast. As such, system 10 may not only detect distributors that have reported viewership data with probable anomalies, but it may also effectively reduce false positives that might require inefficient human intervention. For example, consider a severe weather day resulting in power outages that prevent thousands of households from watching TV for half the day. The viewership for many telecasts that were aired on that day may be significantly lower than the predicted values. However, because the low ratio of the predicted and actual viewership may be seen across all reporting distributors, and may fall between the upper and lower threshold interval, such instances may be taken as reasonable data drops and not be flagged as a data anomaly (i.e., without reporting an alert). This scenario is exemplarily depicted in FIG. 5B. By contrast, an example of avoiding a false negative (i.e., where a negative anomaly is detected, which would otherwise not be detected) is a station going "dark" and becoming unavailable at one of the reporting distributors (e.g., due to re-transmission disputes between the station owner and the distributor). In such scenario, the station's viewership might not be cut off entirely so the distributor may continue reporting low levels of viewership data for this station, for some households in the market. Even though the viewership data may not drop low enough to be detected by existing approaches, processor 20 is indeed able to detect the anomaly that would otherwise go unnoticed (and uncorrected).

Some embodiments of anomaly detection component 36 may additionally or alternatively detect an issue not by the above comparison (i.e., with respect to the calculated ratio of actual number of hours to predicted number of hours) but by detecting that a magnitude changes for one distributor relative to other distributors.

Once the machine learning model completes data predictions and anomalies detection, e.g., for all distributed stations for which reporting data is obtainable, anomaly handling component 38 may generate a report including the alerted distributor-station-telecast information and visualize the reporting viewership trend for each distributor and station. In some embodiments, anomaly handling component 38 is configured to send the generated report to one or more operational teams so, if there are any data spikes or data drops associated with a distributor, the team may quickly react. For example, the responsive team may contact the distributor for further investigation and possible data correction, consult with technology teams to support an internal investigation, or perform other remedial measures. If the data issues are determined to be more easily addressed locally (e.g., via data ingestion and normalization infrastructure associated with processor 20, without relying on any assistance from content sources, content distributors, or the user devices), there may be sufficient time to work to a resolution and perform reprocessing or solution validation, before the viewership data of the target day is finalized/locked. By addressing such anomalous data, system 10 may prevent biases such that audience measurements are reliable and maintained at a high quality level for proper quality assurance; in this manner the finalized viewership data may be confidently used and even as a currency in the marketplace.

In some embodiments, distributor-specific data anomalies may be pinpointed by analyzing data anomalies at fine-grained data points. For example, if a data spike is not detected at all distributors, for a telecast aired by a station, but viewership data breaches the above-mentioned upper threshold, then an alert to a coverage team may be triggered for investigation. One exemplary anomaly handling technique could be to search the Internet about this station to figure out if there is any change associated with the alerted distributor. Another exemplary anomaly handling technique may be to contact an integration operations team to investigate if there is any stream mapping change. The operations team may also contact the distributor to determine the root cause.

Anomaly handling component 38 may, in some embodiments, respond to alerts of a data spike by facilitating investigation of the root cause and correction of the affected data. If the root cause of a data spike is caused by STB changes by the distributor, then a user of system 10 may contact this distributor to attempt resolution of the issue. If, on the other hand, the anomaly is caused by a software defect in importing the distributor's tune-level data, by a mis-mapped stream identifier or by a miscalculated coverage update for audience measurements, then the user of system 10 may work to fix the issue without involvement of distributor 100, user device 90, or content source 50.

Figure 3:
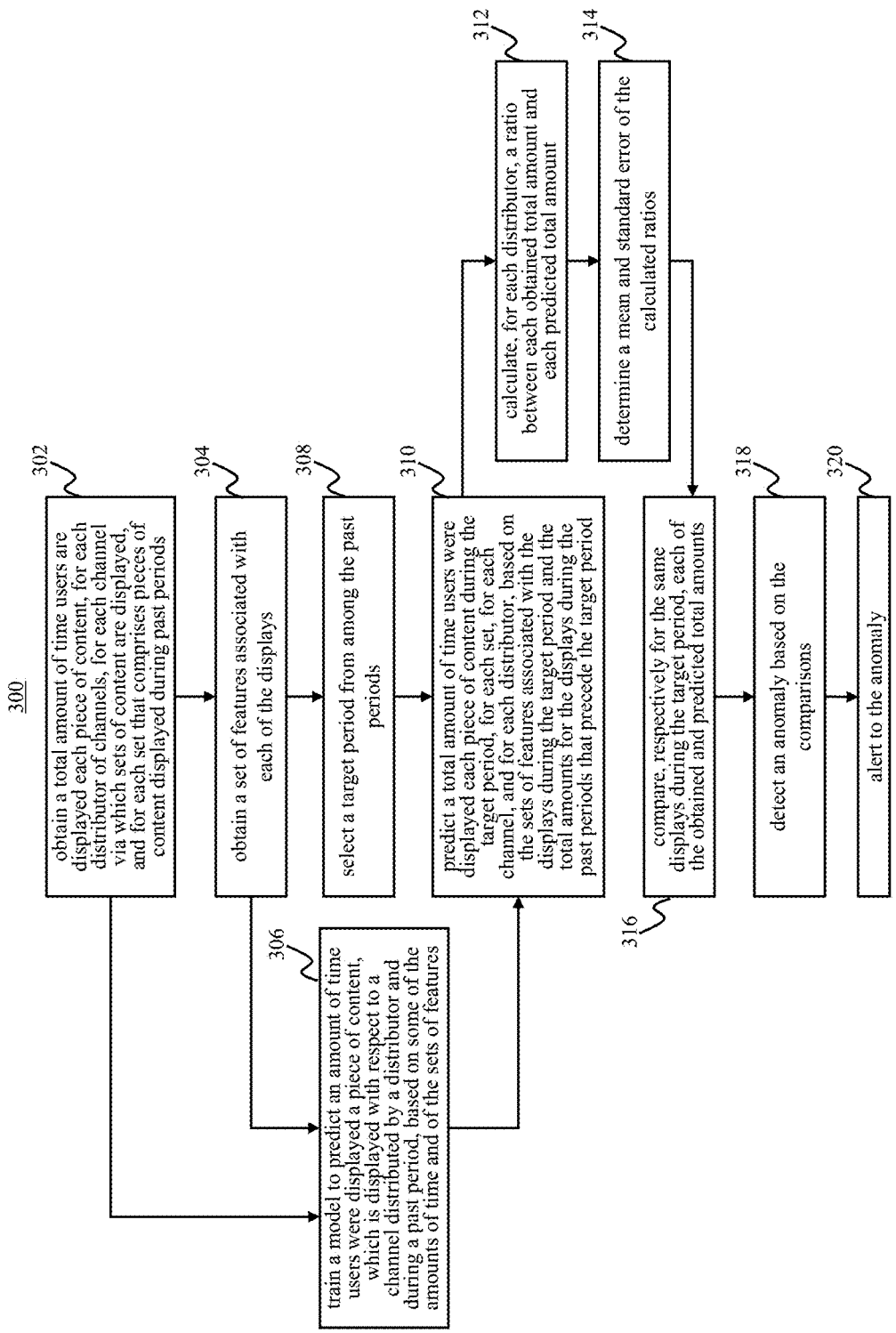
FIG. 3 illustrates a process for managing viewership data, in accordance with one or more embodiments.

FIG. 3 illustrates method 300 for predicting current or future viewership of a piece of content (i.e., of a network, station, telecast) using historic data (e.g., related to program information, airing time, holiday information, etc.), in accordance with one or more embodiments. That is, some embodiments may detect a viewership data issue on one or more target days.

Method 300 may be performed with a computer system comprising one or more computer processors and/or other components. The processors are configured by machine readable instructions to execute computer program components. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting. In some embodiments, method 300 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 300 in response to instructions stored electronically on an electronic storage medium. The processing devices may include one or more devices configured through hardware, firmware, and/or software to be specifically designed for execution of one or more of the operations of method 300.

At operation 302 of method 300, a total amount of time users are displayed each of a plurality of pieces of content may be obtained, for each distributor of channels, for each channel via which sets of content are displayed, and for each set that comprises pieces of content displayed during a plurality of past periods. As an example, content distributors 100 (and/or content sources 50) may report tuning data, observed with respect to network 80, to processor 20 via a different network 70. In another example, content distributors 100 (and/or content sources 50) may report tuning data, observed with respect to network 70, to processor 20 via this same network 70. In some embodiments, operation 302 is performed by a processor component the same as or similar to information component 30 (shown in FIG. 1 and described herein).

At operation 304 of method 300, a set of features associated with each of the displays may be obtained. As an example, the set of features may comprise a normalized average audience, distributor indicator, a holiday indicator, a time of day indicator, a day of week indicator, a day of month indicator, a month of year indicator, a program identifier, a series identifier, and a runtime. In some embodiments, operation 304 is performed by a processor component the same as or similar to information component 30 (shown in FIG. 1 and described herein).

At operation 306 of method 300, a model to predict an amount of time users were displayed a piece of content may be trained based on some of the obtained amounts of time and on some of the obtained sets of features. This piece of content may be displayed with respect to a channel distributed by a distributor and may be displayed during a past period. As an example, the training data of database 60-1 may be used to generate a model that is to be stored in database 60-3. In some embodiments, operation 306 is performed by a processor component the same as or similar to training and testing component 32 (shown in FIG. 1 and described herein).

At operation 308 of method 300, a target period from among the past periods may be selected. As an example, a user may select this period via a user interface, or system 10 may automatically make such selection based on identifying a most recent target day. In some embodiments, operation 308 is performed by a processor component the same as or similar to prediction component 34 (shown in FIG. 1 and described herein).

At operation 310 of method 300, a total amount of time users were displayed each piece of content during the selected target period may be predicted, for each of the sets of pieces of content, for each of the channels, and for each of the distributors, based on (i) the obtained sets of features associated with the displays made during the selected target period and (ii) the obtained total amounts of time for the displays made during the plurality of past periods that precede the target period (e.g., within a moving timeframe that spans the plurality of past periods). As an example, prediction component 34 may predict that a plurality of users, for a single piece of content distributed by one of the distributors, viewed the piece of content for a total amount of 4,274 hours. Prediction component 34 may then predict that a plurality of users, for the same piece of content distributed by a different one of the distributors, viewed the piece of content for a total amount of 3,547 hours. These exemplary values are taken from FIG. 2B. These predictions may repeat for each of the distributors that distributed this piece of content, and then they may repeat for each of the other pieces of content distributed and displayed on the selected target day. In some embodiments, operation 310 is performed by a processor component the same as or similar to prediction component 34 (shown in FIG. 1 and described herein).

At operation 312 of method 300, a ratio between each obtained total amount and each predicted total amount may be calculated, for each distributor. As an example, using a value of FIG. 5A, this ratio may be calculated to be 1.86 (i.e., 4,274 divided by 2,300). In this example, this ratio may then be calculated for the other distributors that distributed the same piece of content of the same station, e.g., to arrive at the 1.02, 0.86, and 1.01 values. In some embodiments, operation 312 is performed by a processor component the same as or similar to anomaly detection component 36 (shown in FIG. 1 and described herein).

At operation 314 of method 300, a mean and standard error of the ratios calculated for the same piece of content may be determined. As an example, using the values of FIG. 5A, the mean may be determined to be 1.19 and the standard error determined to be 0.39. In some embodiments, operation 314 is performed by a processor component the same as or similar to anomaly detection component 36 (shown in FIG. 1 and described herein).

At operation 316 of method 300, each of the obtained and predicted total amounts may be compared, i.e., respectively for the same displays during the target period. In some embodiments, operation 316 is performed by a processor component the same as or similar to anomaly detection component 36 (shown in FIG. 1 and described herein).

At operation 318 of method 300, an anomaly based on the comparisons may be detected by determining whether the ratio calculated for each of the distributors is within upper and lower thresholds, the thresholds being each based on the respective mean and standard error. As an example, using the values of FIG. 5A, the ratio 1.86 of distributor 1 may be detected as being anomalous due to the value being greater than the upper threshold 1.78. In some embodiments, operation 318 is performed by a processor component the same as or similar to anomaly detection component 36 (shown in FIG. 1 and described herein).

At operation 320 of method 300, the anomaly may be alerted to an interested party. As an example, a result of the comparison may trigger an alert, which would otherwise (i.e., using a different, suboptimal approach from the one disclosed here) be considered a false negative. In another example, operation 320 may further comprise data correction, responsive to the anomaly. That is, prior to the obtained total amounts of time for the target period being finalized, anomaly handling component 38 may correct the anomaly using viewership data obtained from a control group by reconciling the anomalous, obtained total amount of time with the predicted total amount of time. At a time of this correction, the target day may remain within the reporting-time window. In some embodiments, operation 320 is performed by a processor component the same as or similar to anomaly handling component 38 (shown in FIG. 1 and described herein).

Figure 4A:
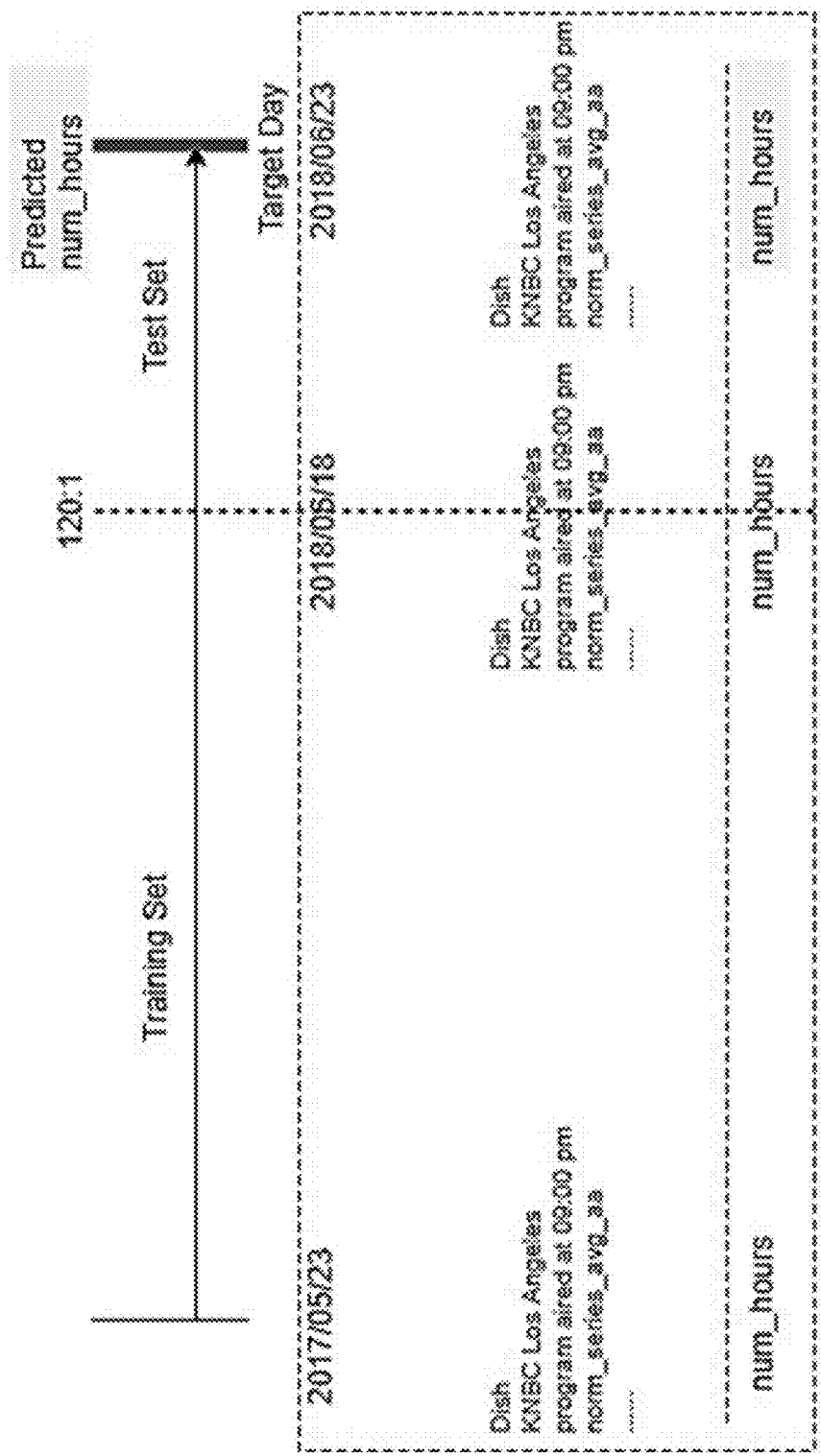
FIG. 4A illustrates a dataset split between training and validation for predicting viewership data on a target day, in accordance with one or more embodiments.
Figure 4B:
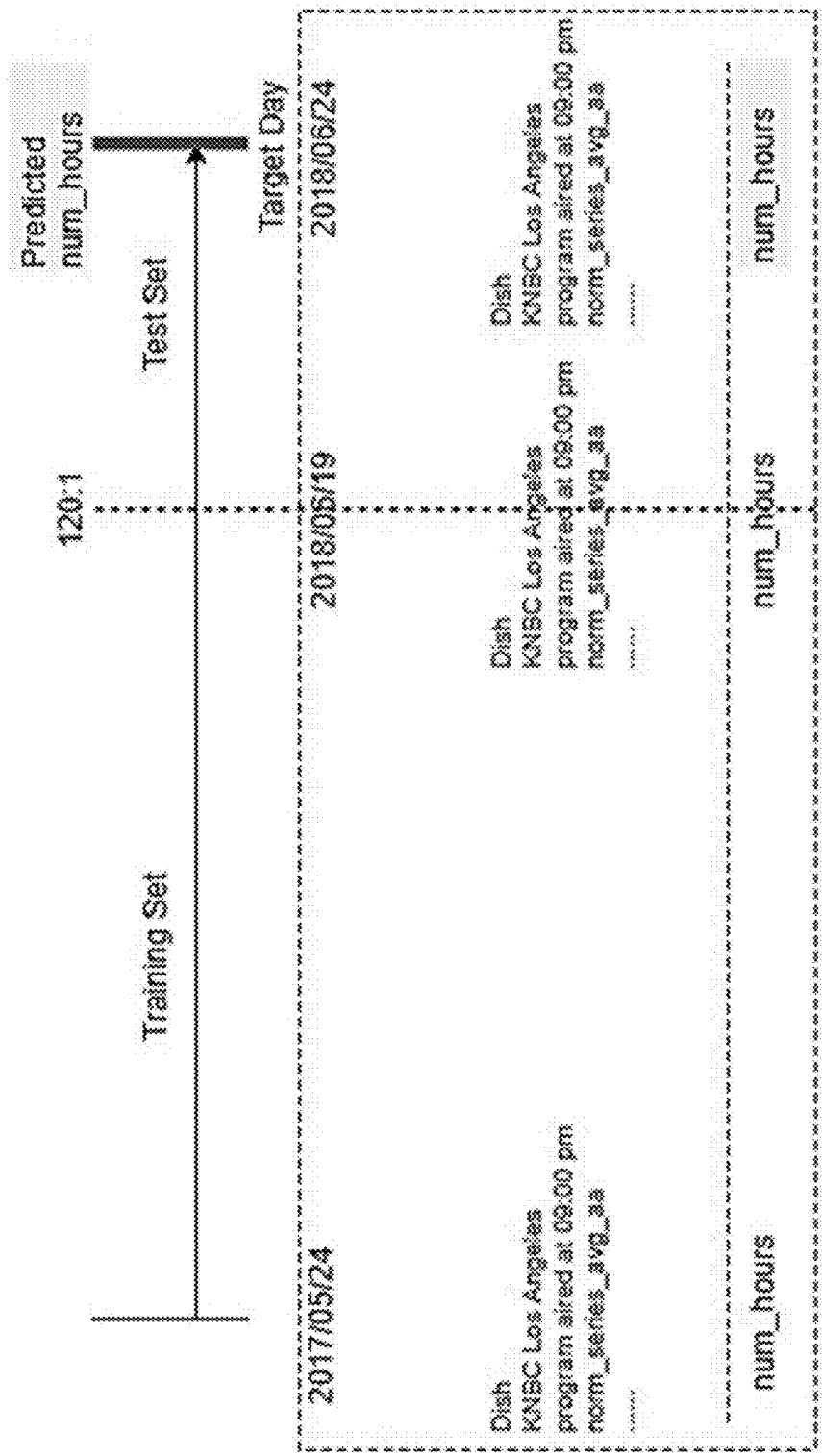
FIG. 4B illustrates a dataset split between training and validation for predicting viewership data on a target day that is advanced one day, in accordance with one or more embodiments.

In some embodiments, after a target day's viewership data is predicted or validated, the herein disclosed approach may re-run periodically (e.g., on a daily basis). In the example of FIG. 4A, the target day is June $23^{rd}$. As the day advances, the target day advances to June $24^{th}$, as exemplarily depicted in FIG. 4B. Some embodiments may thus periodically run the disclosed machine learning data validation tool such that the target day updates each period. For example, a Python-based software program may pull data for Jun. 24, 2018, add it to the 13-month data pull, and discard the May 23, 2017 data that becomes outside the 13-month moving timeframe spanning the plurality of past periods. As such, at least one of the data training, testing, prediction, and alerting operations may be re-run against the new dataset.

Figure 6:
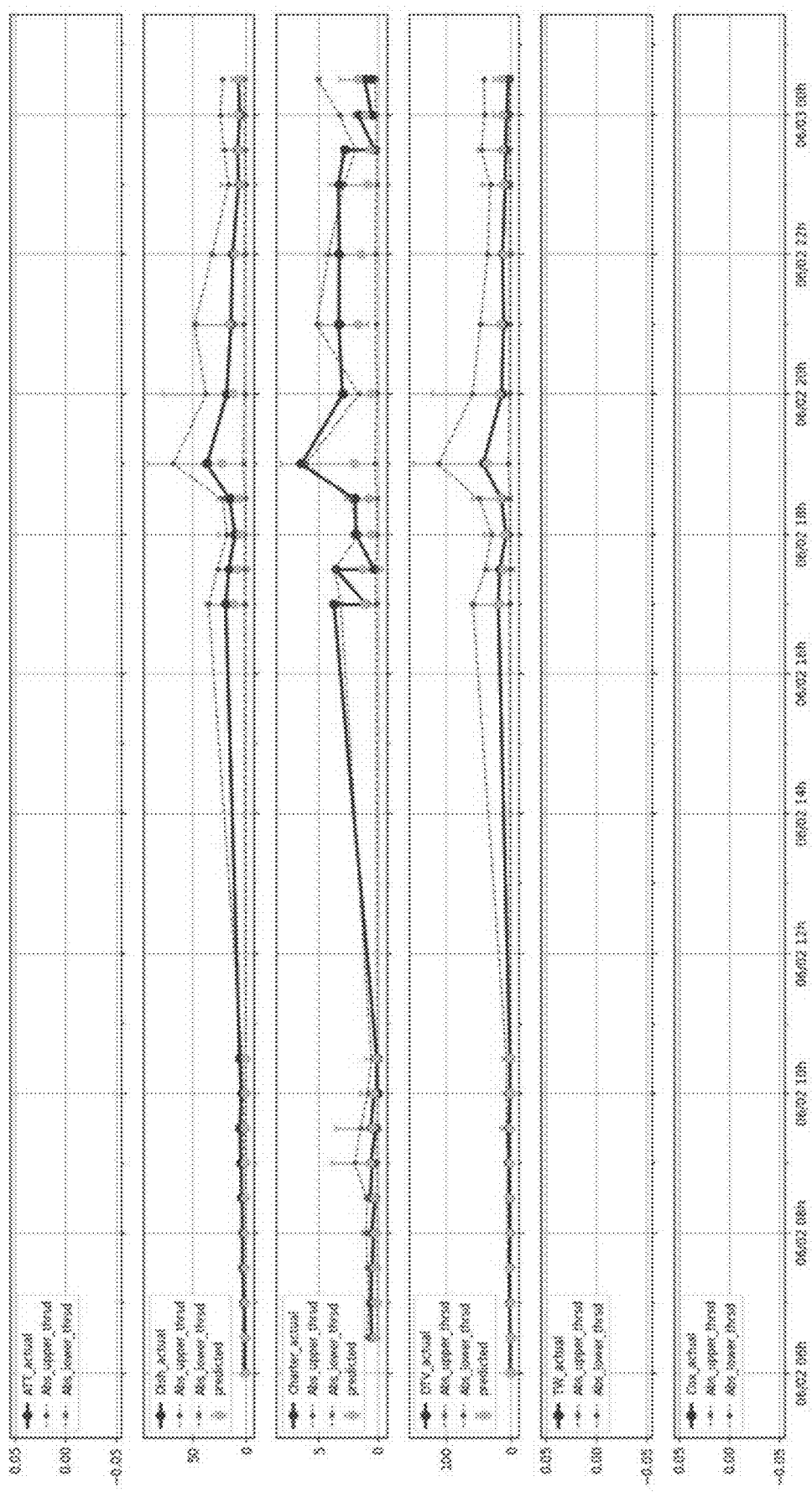
FIG. 6 illustrates a chart of data reported with respect to one channel for determining a viewership trend, in accordance with one or more embodiments.

FIG. 6 illustrates a chart of a station's reporting viewership trend, in accordance with one or more embodiments. On the y-axis is a normalized number of hours a piece of content is viewed. FIG. 6 depicts the trend on a particular day, broken out by the different distributors. In one of these reports of FIG. 6, a couple of telecasts reported higher-than-predicted viewership, plotted points for this distributor going beyond an upper threshold trend. Some embodiments may respond to such an anomaly by flagging it and sending an alert (e.g., a text message or email) to trigger further investigation.

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the invention are specifically illustrated and/or described herein. However, it will be appreciated that modifications and variations are contemplated and within the purview of the appended claims.

What is claimed is:

1. A computer-implemented method for managing viewership data, the method comprising:
   obtaining a first total amount of time that a first plurality of users is displayed a first set of content via a first plurality of content distributors during a plurality of past periods including a target period;
   obtaining a second total amount of time that a second plurality of users is displayed a second set of content via a second plurality of content distributors during the plurality of past periods including the target period;
   obtaining a first set of features associated with the display of the first set of content
   obtaining a second set of features associated with the display of the second set of content;
   predicting, via a trained model, a predicted first total amount of time that the first plurality of users would be displayed the first set of content during the target period based on the obtained first set of features associated with the first display of the first set of content and on the obtained first total amount of time that occurred during past periods that precede the target period;
   predicting, via the trained model, a predicted second total amount of time that the second plurality of users would be displayed the second set of content during the target period based on the obtained second set of features associated with the display of the second set of content and on the obtained second total amount of time that occurred during the past periods that precede the target period;
   comparing the obtained first total amount of time during the target period to the predicted first total amount of time and the obtained second total amount of time during the target period to the predicted second total amount of time;
   detecting an anomaly based on at least one of the obtained first total amount of time during the target period deviating from the predicted first total amount of time or the obtained second total amount of time during the target period deviating from the predicted second total amount of time; and alerting, based on the detection of the anomaly, to the anomaly.

2. The computer-implemented method of claim 1, wherein:
the first set of features comprises a normalized average audience, and at least one of a distributor indicator, a holiday indicator, a time of day indicator, a day of week indicator, or a month of year indicator; and
the second set of features comprises a normalized average audience, and at least one of a distributor indicator, a holiday indicator, a time of day indicator, a day of week indicator, or a month of year indicator.

3. The computer-implemented method of claim 1, further comprising:
training the model to predict a total amount of time users would be displayed a content based on a portion of the obtained first total amount of time, a portion of the obtained second total of time, a portion of the obtained first set of features, and a portion of the obtained second set of features.

4. The computer-implemented method of claim 1, further comprising:
periodically repeating, for content displayed in a most-recent period, both of the obtaining operations and the predicting operations; and
discarding total amounts of time and sets of features associated with least-recent displays of content, the least-recent displays of content being during a past period that becomes outside of a moving timeframe ending with the most-recent period.

5. The computer-implemented method of claim 4, wherein the periodic repetitions are performed daily.

6. The computer-implemented method of claim 3, wherein the model is trained using a random forest model.

7. The computer-implemented method of claim 2,
wherein an average number of devices is calculated by dividing a sum of the obtained total amounts of time for the content by a duration of display of one of the content, and
wherein the normalized average audience is determined by normalizing the average number of devices by a most viewed content displayed during the past periods.

8. The computer-implemented method of claim 1, wherein each content is a telecast of a series or an over-the-top program.

9. The computer-implemented method of claim 1, wherein:
comparing the obtained first total amount of time during the target period to the predicted first total amount of time comprises calculating a first ratio between the obtained first total amount and the predicted first total amount; and
comparing the obtained second total amount of time during the target period to the predicted second total amount of time comprises calculating a second ratio between the obtained second total amount and the predicted second total amount.

10. The computer-implemented method of claim 9, wherein detecting the deviation comprises determining whether the first ratio or the second ratio is not within upper and lower thresholds.

11. The computer-implemented method of claim 1, wherein the target period spans a portion of an hour.

12. The computer-implemented method of claim 1, wherein:
the first plurality of content distributors distribute over a first channel,
the second plurality of content distributors distribute over a second channel, and
the first channel and the second channel are based on different communication media.

13. The computer-implemented method of claim 1, wherein the first plurality of content distributors and the second plurality of content distributors are different multi-channel video programming distributor (MVPD).

14. The computer-implemented method of claim 1, further comprising:
prior to the obtained first and second total amounts of time for the target period being finalized, correcting the anomaly using viewership data obtained from a control group.

15. A system, comprising:
at least one processor;
at least one memory comprising instructions configured to be executed by the at least one processor to perform a method comprising:
obtaining a first total amount of time that a first plurality of users is displayed a first set of content via a first plurality of content distributors during a plurality of past periods including a target period;
obtaining a second total amount of time that a second plurality of users is displayed a second set of content via a second plurality of content distributors during the plurality of past periods including the target period;
obtaining a first set of features associated with the display of the first set of content;
obtaining a second set of features associated with the display of the second set of content;
predicting, via a trained model, a predicted first total amount of time that the first plurality of users would be displayed the first set of content during the target period based on the obtained first set of features associated with the display of the first set of content and on the obtained first total amount of time that occurred during past periods that precede the target period;
predicting, via the trained model, a predicted second total amount of time that the second plurality of users would be displayed the second set of content during the target period based on the obtained second set of features associated with the display of the second set of content and on the obtained second total amount of time that occurred during the past periods that precede the target period;
comparing the obtained first total amount of time during the target period to the predicted first total amount of time and the obtained second total amount of time during the target period to the predicted second total amount of time;
detecting an anomaly based on at least one of the obtained first total amount of time during the target period deviating from the predicted first total amount of time or the obtained second total amount of time during the target period deviating from the predicted second total amount of time; and
alerting, based on the detection of the anomaly, to the anomaly.

16. The system of claim 15, wherein:
the first set of features comprises a normalized average audience, and at least one of a distributor indicator, a holiday indicator, a time of day indicator, a day of week indicator, or a month of year indicator; and
the second set of features comprises a normalized average audience, and at least one of a distributor indicator, a holiday indicator, a time of day indicator, a day of week indicator, or a month of year indicator.

17. The computer-implemented method of claim 9, further comprising determining a mean and standard error of the calculated first and second ratios.

18. The computer-implemented method of claim 9, wherein:
the first ratio is calculated for each content in the first set of content and for each content distributor in the first plurality of content distributors, and
the second ratio is calculated for each content in the second set of content and for each content distributor in the second plurality of content distributors.

19. The computer-implemented method of claim 14, wherein correcting the anomaly using the viewership data obtained from the control group is done while the target period remains within a reporting-time window.

20. A computer-implemented method for managing viewership data, the method comprising:
obtaining a first total amount of time that a first plurality of users is displayed a first set of content via a first plurality of content distributors during a plurality of past periods including a target period;
obtaining a second total amount of time that a second plurality of users is displayed a second set of content via a second plurality of content distributors during the plurality of past periods including the target period;
obtaining a first set of features associated with the display of the first set of content;
obtaining a second set of features associated with the display of the second set of content;
predicting, via a trained model, a predicted first total amount of time that the first plurality of users would be displayed the first set of content during the target period based on the obtained first set of features associated with the display of the first set of content and on the obtained first total amount of time that occurred during past periods that precede the target period;
predicting, via the trained model, a predicted second total amount of time that the second plurality of users would be displayed the second set of content during the target period based on the obtained second set of features associated with the display of the second set of content and on the obtained second total amount of time that occurred during the past periods that precede the target period;
calculating a first ratio between the obtained first total amount and the predicted first total amount and a second ratio between the obtained second total amount and the predicted second total amount;
determining that the first ratio or the second ratio is not within upper and lower thresholds; and
alerting, based on the determination that the first ratio or the second ratio is not within the upper and lower thresholds, to an anomaly.

* * * * *